Feb. 25, 1941. C. J. KINZIE ET AL Re. 21,726

METHOD OF MAKING ZIRCONIUM OXIDE

Original Filed Sept. 2, 1936 2 Sheets-Sheet 1

INVENTOR.
CHARLES J. KINZIE
DONALD S. HAKE
BY Philip B. Reh
ATTORNEY

METHOD OF MAKING ZIRCONIUM OXIDE

Original Filed Sept. 2, 1936 2 Sheets-Sheet 2

INVENTOR.
CHARLES J. KINZIE
DONALD S. HAKE
BY Philip B. Rich
ATTORNEY

Reissued Feb. 25, 1941

Re. 21,726

UNITED STATES PATENT OFFICE 21,726

METHOD OF MAKING ZIRCONIUM OXIDE

Charles J. Kinzie and Donald S. Hake, Niagara Falls, N. Y., assignors to The Titanium Alloy Manufacturing Company, New York, N. Y., a corporation of Maine Original No. 2,168,603, dated August 8, 1939, Serial No. 99,030, September 2, 1936. Application for reissue October 11, 1940, Serial No. 360,854

11 Claims. (Cl. 23—16)

Our invention relates to the production of an improved anhydrous crystalline zirconium oxide, more particularly a new crystalline zirconium oxide of a high degree of purity and of exceptionally uniform particle size and other advantageous properties, in the electric resistance furnace with the incidental production of silicon carbide as a byproduct of the waste heat of the reaction.

The accompanying drawings show a type of an electric resistance furnace in which our invention may be practiced.

Figure 1:
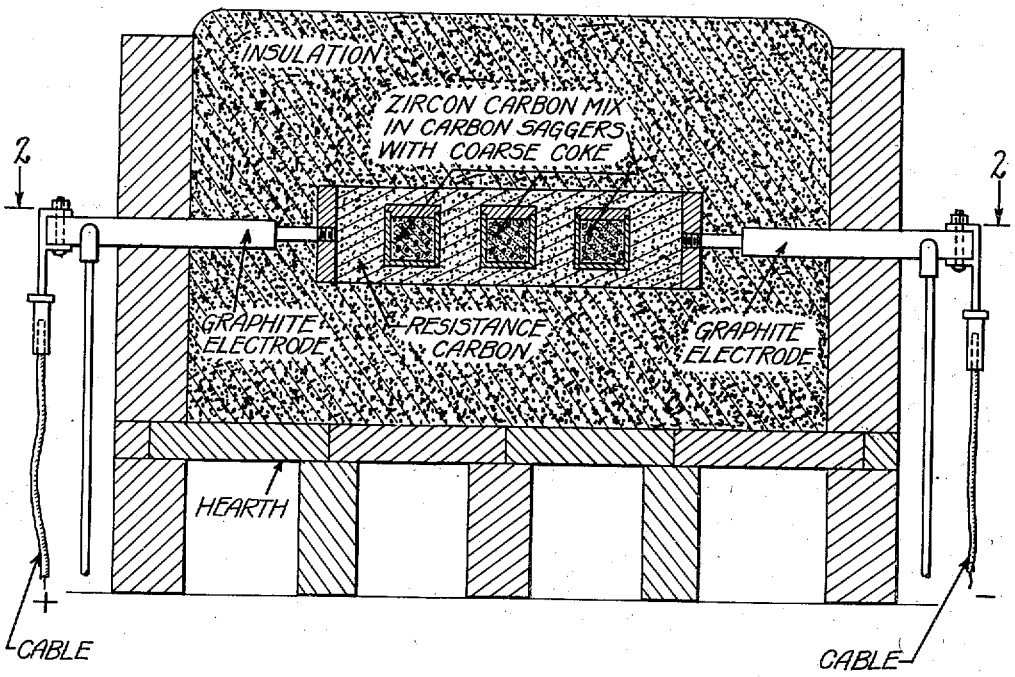
Fig. 1 is a sectional elevation of the furnace and its contents.
Figure 2:
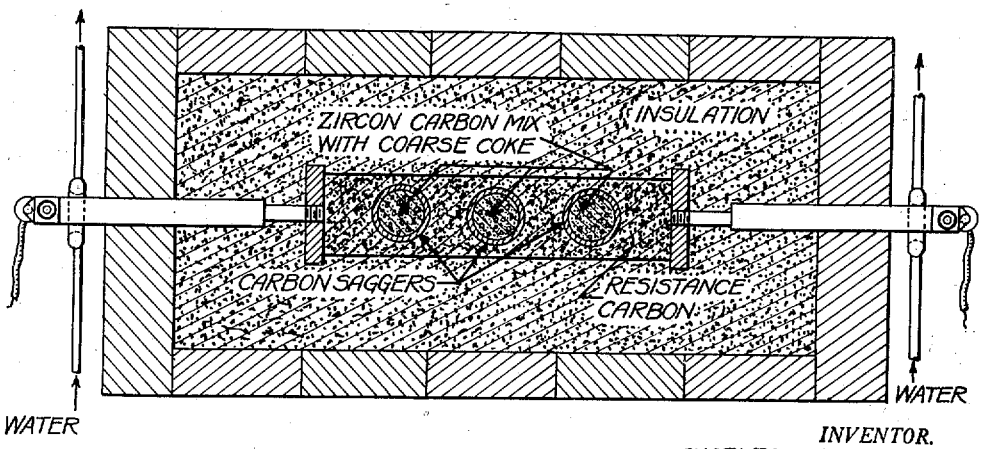
Fig. 2 is a horizontal section taken on the line 2—2 of Fig. 1.
Figure 3:
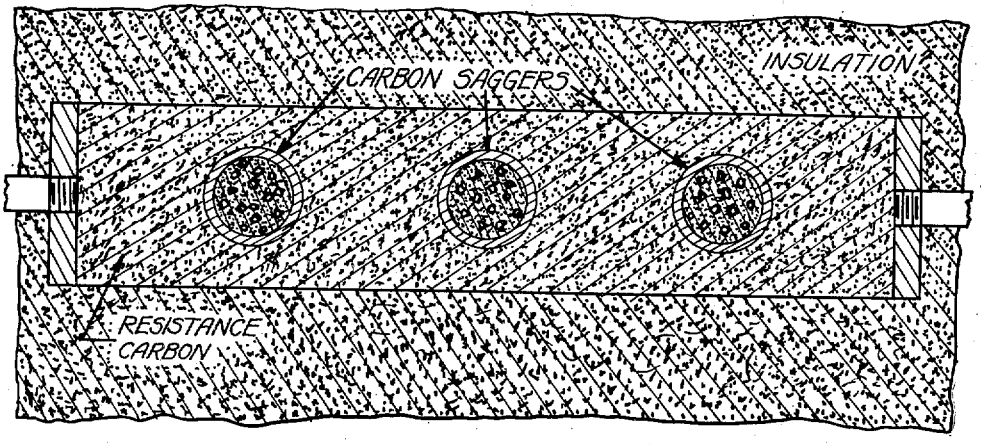
Fig. 3 is an enlarged section of what is illustrated in Fig. 2 to show a preferred method of loading.
Figure 4:
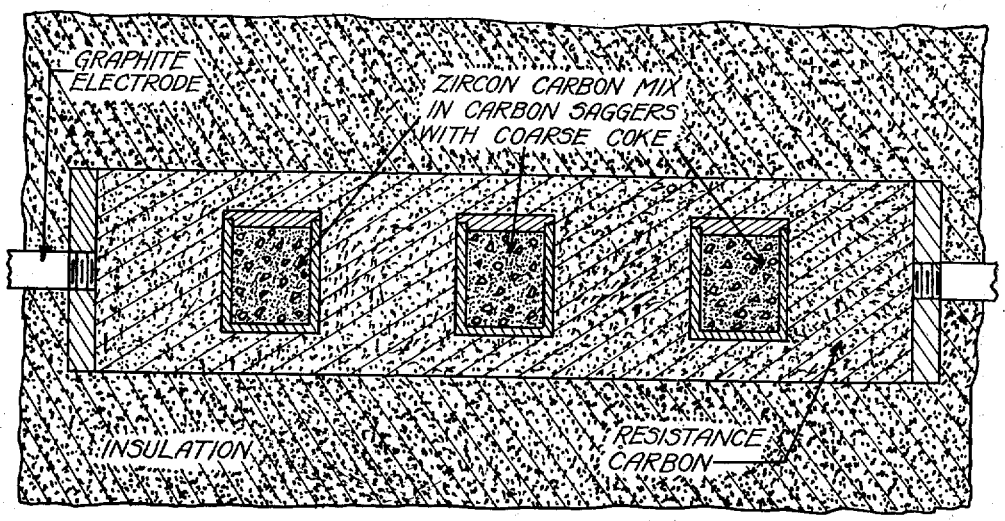
Fig. 4 is an enlarged horizontal section of what is illustrated in Fig. 1 to show a preferred method of loading.

Referring to these Figs. 1 and 2, the hearth of any suitable material is supported on piers, the hearth forming a supporting base for the furnace and its charge. Such base has also side and end walls to hold the charge. Through each of the end walls is a suitable opening for arranging the graphite electrodes, while the sidewalls of the furnace are built up of loose bricks to permit the free escape of evolved gases.

Outside the furnace the ends of the graphite electrodes may be cooled by passing a current of water through them as shown in Figs. 1 and 2.

Extensive researches covering many variations in proportions, treatment in furnace, etc., have led us to the following conclusions:

A. That zirconium silicate ($ZrSiO_4$) in proper admixture with carbon could be made to yield an essentially silicon-free zirconium compound from which free separate crystals of $ZrO_2$ of the desired particle size could be made, and that by processing according to either of our alternative methods, the silicon carbide could be made to separate from the zirconium compound.

B. An important part of our improved methods is in our relatively fine carbon (petroleum coke) —80 mesh, that is, intimately mixed with the granules of $ZrSiO_4$, most of which were also in size —80 mesh since the carbon and zircon when treated should be of about the same particle size.

C. Another important feature of our invention is the proportion of petroleum coke to zircon. 25 parts by weight of —80 mesh petroleum coke to 100 parts by weight of zircon is preferred. We have found that if much less coke is used, there is formed in proportion to the lowered coke content an increasing amount of zirconium oxide in the form of undesirable large crystals, more or less like synthetic baddeleyite. For example, a mixture of 100 parts of zircon and 18 parts of coke will show very definite amounts of synthetic baddeleyite aggregates on the screen along with SiC aggregates. Such formation is usually undesired, since synthetic baddeleyite is not particularly suitable for subsequent processing to form an opacifier for vitreous enamels, even if it could be separated from the SiC. On the other hand, if the amount of fine coke is increased, the surplusage is consumed to form SiC in small separate crystals which can not be readily separated from the desired zirconium compound.

D. Our discovery that by adding to the mixture of 100 parts of zircon and 25 parts of fine coke, 25 parts of petroleum coke between $\frac{1}{16}''$ and $\frac{1}{4}''$ in size, preferably $\frac{1}{8}''$, these coke pieces serve as absorbing zones for the silicon compound which completely leaves the zirconium. The silicon forms silicon carbide crystals as aggregates, which remain more or less of the original coarse coke size. It is thus possible by coarse sieving initially to remove most of the SiC from the zirconium compound.

E. By sieving to —40 mesh the sagger discharge, the zirconium-carbon complex is almost completely separated from the SiC, the latter remaining on the sieve. Since the zirconium compound formed must be ultimately calcined in an oxidizing atmosphere to $ZrO_2$, such calcination may be done by heating the entire discharge derived from saggers. The granular zirconium-carbon compound is thereby converted to the desired $ZrO_2$ product, while the SiC remains unaltered in the form of relatively large crystals, and may be removed by any suitable means, such as screening, flotation, tabling, air separation; we have used sieving with good success.

F. The temperature in the charge during the electric resistance furnace operation should be kept well below the decomposition point of the silicon carbide. We have found that a temperature between 1800–2000° C. is best, preferably around 1800° C., or as low as possible in order to produce the desired $ZrO_2$ product. If the temperature goes too high, fully formed zirconium carbide results, which yields undesired large crystals of $ZrO_2$ upon calcination.

G. Where a $ZrO_2$ containing very small amounts of SiC is desired, we have found that such product may be produced by first placing a layer of ⅛'' coke inside the sagger walls, and then inserting therein the 100:25 mix of −80 mesh zircon and −80 mesh coke followed by heating, etc. In this way the SiC forms an inner wall in the sagger due to the fact that the silicon completely leaves the Zr zone, and the granular zirconium compound is easily removed and calcined to a cream white product with but a trace of SiC. For practical reasons of operation we prefer the first method, since it yields commercially practical results with less work.

The following examples will show how our improved methods may be practiced to obtain our novel and improved anhydrous crystalline zirconium oxide:

*Example 1*

Zirconium silicate in granular form and previously purified so as to contain less than 0.01% $TiO_2$, and less than 0.01% $Fe_2O_3$ with only traces of other impurities is preferably used, although less pure $ZrSiO_4$ can be used if the requirements of the end product will permit. The $ZrSiO_4$ should all pass a 35 mesh screen, and more than 80 per cent will be −80 mesh with but a per cent or so finer than 325 mesh. Petroleum coke is used that contains approximately

| | Per cent |
|---|---|
| Fixed carbon | 85–90 |
| Volatile matter | 8 |
| Ash | 0.25 |

This coke is ground so as to pass an 80 mesh sieve.

A mixture is then made consisting of:

| | Parts by weight |
|---|---|
| Zirconium silicate | 100 |
| Petroleum coke −80 mesh | 25 |

To this mixture are added 25 parts by weight of coarse petroleum coke $\frac{1}{16}$'' to ¼'', but preferably as close to ⅛'' size as possible, and the whole charge is intimately mixed. Each of the three carbon saggers shown in Figs. 1 and 2 is filled with the charge, and then placed in the core of the resistance furnace as illustrated in Figs. 1 and 2.

The power input, period of the run, etc., will of course vary with the size of the saggers, furnace type, etc., but the temperature and time under heat should be such as only to decompose the zircon, convert its zirconium into a zirconium-carbon-oxygen complex, and allow the silicon compounds to be fully converted to silicon carbide by absorption within the coarse carbon pieces. But we avoid such as excess of heat or its duration as would tend to fully form zirconium carbide.

Under these described conditions, the charge upon cooling will consist of two phases—one a zirconium-carbon-oxygen compound or coherent granular zirconium carboxide and aggregates of SiC crystals in the places where pieces of coarse coke were formerly located.

By screening the cooled sagger discharge through a 40 mesh sieve, two portions were obtained composed substantially of

| | Per cent |
|---|---|
| SiC plus residual coke | 30 |
| Granular zirconium carboxide | 70 |

The 70% −40 mesh zirconium compound contained approximately:

| | Per cent |
|---|---|
| Zr | 79.00 |
| Ti | 0.01 |
| SiC | 2.00 |
| Fe | 0.01 |
| C | 10.00 |
| Oxygen | 8.98 |
| | 100.00 |

The 30% SiC plus C would actually contain about ⅔ its weight of SiC, as some surplus of carbon is desirable. From this product crystals of SiC may be obtained by igniting to oxidize the free carbon, crushing, washing, etc., to produce grains of SiC.

The improved zirconium oxide is produced from the −40 mesh zirconium compound product by ignition in air and cooling. This product is a fairly clean cream-white powder. By feeding the powder into a stream of air and collecting in a dust chamber, any loose aggregates are freed, and the resulting product may then be obtained by suitable lawning (−325 mesh) or by any suitable gravity separation method, air classification, floatation, etc., so as to be essentially free of SiC.

Typical zirconium oxide products thus produced contain approximately:

| | Per cent |
|---|---|
| $ZrO_2$+adsorbed gas | 98.80 |
| $TiO_2$ | 0.02 |
| $Fe_2O_3$ | 0.01 |
| SiC | 0.40 |
| $Al_2O_3$ | 0.30 |
| Rare earths | 0.20 |
| Others | 0.27 |
| | 100.00 |

*Example 2*

Figure 5:
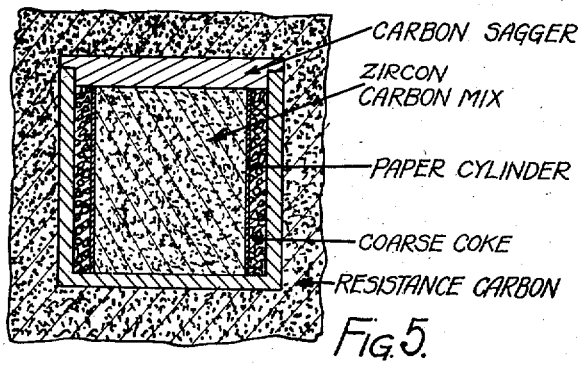
Fig. 5 is an enlarged detail vertical section showing a modified method of loading the saggers.

This procedure differs from Example 1 only to the extent that inside each sagger is placed a cylinder of thin paper as shown in Fig. 5, just strong enough to support a $\frac{3}{16}$'' layer of $\frac{1}{16}$'' petroleum coke inside the sagger wall. With the paper in place and the coarse coke charged, the mixture of 100 parts zircon sand and 25 parts −80 mesh coke is then arranged to fill the space inside the paper cylinder. The carbon covers are put on and the three saggers are then placed in the core of the furnace and the run made as in Example 1.

The granular zirconium carboxide may then be removed entirely free from the SiC which now has been formed as a lining. The zirconium carboxide compound upon calcination yields a pure $ZrO_2$ which under best conditions is free of SiC, without recourse to lawning. The SiC is then readily detached from the sagger and any free carbon removed by ignition and the SiC may be recovered.

We claim:

1. The method of making anhydrous crystalline zirconium oxide from zirconium silicate or zircon, which comprises placing a mixture of finely-divided zircon and finely-divided carbon, together with larger particles of coarse coke of sufficient size to serve as nuclei for particles of silicon carbide formed, within a carbon container surrounded by resistance carbon acting substantially as the heat-producing resistor, but substantially mechanically separated therefrom, and then heating said separated charge in an electric resistance furnace by temperatures mainly developed in the resistor surrounding the charge without fusion, but with substantial decomposition of the charge, to yield a separable mixture of an essentially silicon-free zirconium-carbon-oxygen complex and separable silicon carbide crystal aggregates absorbed within the larger particles of coarse coke.

2. The method of making anhydrous crystalline zirconium oxide from zirconium silicate or zircon, which comprises placing a mixture of finely-divided zircon and finely-divided carbon in proportions of about 4 to 1 and of substantially the same particle size, together with larger particles of coarse coke of sufficient size to serve as nuclei for particles of solicon carbide formed, within a carbon container surrounded by resistance carbon acting substantially as the heat-producing resistor, but substantially mechanically separated therefrom, and then heating said separated charge in an electric resistance furnace by temperatures mainly developed in the resistor surrounding the charge without fusion, but with substantial decomposition of the charge, to yield a separable mixture of an essentially silicon-free zirconium-carbon-oxygen complex and separable silicon carbide crystal aggregates absorbed within the larger particles of coarse coke.

3. The method of making anhydrous crystalline zirconium oxide from zirconium silicate or zircon, which comprises placing a mixture of finely-divided zircon and finely-divided carbon in proportions of about 4 to 1 and of substantially the same particle size, together with larger particles of coarse coke of sufficient size to serve as nuclei for particles of silicon carbide formed in proportions of about 4 of zircon to 1 of coke, within a carbon container surrounded by resistance carbon acting substantially as the heat-producing resistor, but substantially mechanically separated therefrom, and then heating said separated charge in an electric resistance furnace by temperatures mainly developed in the resistor surrounding the charge without fusion, but with substantial decomposition of the charge, to yield a separable mixture of an essentially silicon-free zirconium-carbon-oxygen complex and separable silicon carbide crystal aggregates absorbed within the larger particles of coarse coke.

4. The method of making anhydrous crystalline zirconium oxide from zirconium silicate or zircon, which comprises placing a mixture of finely-divided zircon and finely-divided carbon, in which mixture are contained larger particles of coarse coke, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

5. The method of making anhydrous crystalline zirconium oxide from zirconium silicate or zircon, which comprises placing a mixture of finely-divided zircon and finely-divided carbon of substantially the same particle size, in which mixture are contained larger particles of coarse coke, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

6. The method of making anhydrous crystalline zirconium oxide from zirconium silicate or zircon, which comprises placing a mixture of finely-divided zircon and finely-divided carbon in proportions of about 4 to 1, in which mixture are contained larger particles of coarse coke, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

7. The method of making anhydrous crystalline zirconium oxide from zirconium silicate or zircon, which comprises placing an intimate mixture of finely-divided zircon and finely-divided carbon in proportions of about 4 to 1 and of substantially the same particle size, in which mixture are contained larger particles of coarse coke, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

8. The method of making anhydrous crystalline zirconium oxide from zirconium silicate or zircon, which comprises placing an intimate mixture of finely-divided zircon and finely-divided carbon in proportions of about 4 to 1, mixed with particles of coarser coke in the proportion of zircon to coarser coke of about 4 to 1, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

9. The method of making anhydrous crystalline zirconium oxide from zirconium silicate or zircon, which comprises placing a mixture of finely-divided zircon and finely-divided carbon in proportions of about 4 to 1, in which mixture are contained larger particles of coarse coke, within a carbon container surrounded by resistance carbon acting substantially as the heat-producing resistor, but substantially mechanically separated therefrom, then heating said separated charge in an electric resistance furnace between 1800° and 2000° C. by heat mainly developed in the resistor surrounding the charge without fusion, but with substantial decomposition of the charge, to yield an essentially silicon-free zirconium-carbon-oxygen complex and separable silicon carbide crystal aggregates, calcining the mass under oxidizing conditions to produce said zirconium oxide, and then separating the silicon carbide crystal aggregates from the zirconium oxide.

10. The method of making anhydrous crystalline zirconium oxide from zirconium silicate or zircon, which comprises placing a mixture of finely-divided zircon and finely-divided carbon, together with larger particles of coarse coke, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, separating the silicon carbide crystal aggregates from the said zirconium-carbon-oxygen complex, and calcining the latter under oxidizing conditions to produce said anhydrous crystalline zirconium oxide.

11. The method of making anhydrous crystalline zirconium oxide from zirconium silicate or zircon, which comprises placing an intimate mixture of finely-divided zircon and finely-divided carbon in proportions of about 4 to 1 and of substantially the same particle size, in which mixture are contained larger particles of coarse coke, within a carbon container surrounded by resistance carbon acting substantially as the heat-producing resistor, but substantially mechanically separated therefrom, then heating said separated charge in an electric resistance furnace by the temperatures mainly developed in the resistor surrounding the charge without fusion, but with substantial decomposition of the charge, to yield an essentially silicon-free zirconium-carbon-oxygen complex and separable silicon carbide crystal aggregates, separating the silicon carbide crystal aggregates from the said zirconium-carbon-oxygen complex, and calcining the latter under oxidizing conditions to produce said anhydrous crystalline zirconium oxide.

CHARLES J. KINZIE.
DONALD S. HAKE.